United States Patent [19]
Dennhardt et al.

[11] 3,778,154
[45] Dec. 11, 1973

[54] METHOD OF AND APPARATUS FOR AUTOMATICALLY CONTROLLING THE SPEED AT WHICH AN ORIGINAL AND COPYING MATERIAL PASS THROUGH A COPYING MACHINE

[75] Inventors: Werner Dennhardt, Bleidenstadt; Herbert Schroter, Hahn/Taunus, both of Germany

[73] Assignee: Kalle Aktiengesellschaft, Wiesbaden-Biebrich, Germany

[22] Filed: Apr. 20, 1972

[21] Appl. No.: 245,713

[30] Foreign Application Priority Data
Apr. 22, 1971 Germany................... P 21 19 373.7

[52] U.S. Cl..................................... 355/68, 355/83
[51] Int. Cl. .......................................... G03b 27/72
[58] Field of Search................................ 355/68, 83

[56] References Cited
UNITED STATES PATENTS
3,642,377  2/1972  Young ................................. 355/83
2,928,327  3/1960  Blackmer et al...................... 355/83
3,519,347  7/1970  Bowker et al......................... 355/68
3,472,592  10/1969  Nichols et al........................ 355/83
3,588,247  6/1971  Noda .................................. 355/83

Primary Examiner—John M. Horan
Attorney—James E. Bryan

[57] ABSTRACT

This invention relates to an electronic method of automatically controlling the speed of a motor used to pass an original and copying material, on which an image of said original is to be produced, through the exposure zone of a copying machine, successive originals continuously passing through the machine in a manner such that a succeeding original gives rise to a speed-determining signal before a preceding original has left the exposure zone, which comprises storing a signal until the preceding original has left the exposure zone, interrogating the said signal for the purpose of controlling the speed of the motor for the period during which the said succeeding original is passed through the exposure zone, and cancelling the interrogated signal. This invention also relates to an apparatus for performing the method.

24 Claims, 5 Drawing Figures

METHOD OF AND APPARATUS FOR AUTOMATICALLY CONTROLLING THE SPEED AT WHICH AN ORIGINAL AND COPYING MATERIAL PASS THROUGH A COPYING MACHINE

This invention relates to a method of and apparatus for automatically controlling the speed at which an original and copying material pass through a copying machine.

Since the translucency of different originals and the sensitivity of copying materials fluctuate within wide limits, the speed of travel of an original and of copying material through the copying station of a copying machine must be varied correspondingly. In conventional copying machines, the operator alters the speed of travel by hand and this often leads to incorrect settings.

Apparatus thereof has been developed in which the translucency of the originals is measured with the aid of a photosensitive measuring unit, and the speed of revolution of the driving motor is adjusted in accordance with the translucency measured (see German Patent No. 925,751 and German Gebrauchsmuster No. 1,977,688).

German Patent No. 1,522,790, as laid open, discloses an apparatus for automatically controlling the speed of travel of an original and of copying material through a copying machine, in which apparatus the translucency of the original is measured with the aid of a CdS photoresistor, the resistance of which determines the potential of a capacitor, which stores the potential, so that during the copying of an original, a constant speed of travel equal to that determined, is maintained. With this apparatus, however, a second original can be fed in and its translucency measured only after the first original has been copied, and this leads to loss of time in the copying operations.

The present invention provides an electronic method of automatically controlling the speed of a motor used to pass an original and copying material, on which an image of the original is to be produced, through the exposure zone of a copying machine, successive originals continuously passing through the machine in a manner such that a succeeding original gives rise to a speed-determining signal before a preceding original has left the exposure zone, in which method such a signal is stored until the preceding original has left the exposure zone, whereupon the signal is interrogated for the purpose of controlling the speed of the motor for the period during which the succeeding original is passed through the exposure zone, the interrogated signal being cancelled. The speed-determining signal may be obtained by measuring the translucency of the succeeding original.

Thus, originals can be fed successively into the copying machine without loss of time, the signals measured on the basis of their translucency can be stored, and these signals can be interrogated and used for controlling the speed of the motor when the corresponding originals reach the copying station.

The method of the invention is suitable both for copying machines in which the copying material is supplied in the form of sheets and for such machines in which the copying material is in the form of a continuous web supplied from one or more rolls, from which the copying material is automatically drawn and cut to suit the length and width of the original to be copied.

The invention also provides an apparatus for automatically controlling the speed at which a succeeding original and copying material pass through the copying zone of a continuously operable copying machine having a motor drive for originals and copying material, the apparatus comprising, successively disposed in the path of travel of the original upstream of the copying zone:
   at least one photosensitive measuring unit, arranged to measure the translucency of the original,
   at least one first switching element which is adapted for actuation by the leading edge of the original and which when so actuated:
   a. switches on a first step-by-step switching system and
   b. connects the photosensitive measuring unit to a storage unit for a period depending on the measured translucency by way of the first step-by-step switching system whereby the signal derived from said measuring unit is stored,
   at least one second switching element which is adapted for actuation by the leading edge of the original and which when so actuated switches on a second step-by-step switching system whereby the stored signal is passed through an amplifier to a device for controlling the speed of the motor during the passage of the original and copying material through the copying zone, and
   at least one third switching element which is adapted for actuation by the leading edge of the original and which when so actuated switches on a third step-by-step switching mechanism, whereby a stored signal relating to the preceding original is cancelled.

The invention further provides an apparatus for automatically controlling the speed at which an original and copying material pass through the copying zone of a copying machine having a motor drive for the original and the copying material, the apparatus comprising, successively disposed in the path of travel of the original upstream of the copying zone:
   at least one photosensitive measuring unit, arranged to measure the translucency of the original,
   at least one first switching element which is adapted for actuation by the leading edge of the original and which when so actuated:
   a. switches on a first step-by-step switching system and
   b. connects the photosensitive measuring unit to a storage unit for a period depending on the measured translucency by way of the first step-by-step switching system, whereby the signal derived from the measuring unit is stored,
   at least one second switching element which is adapted for actuation by the leading edge of the original and which when so actuated switches on a second step-by-step switching system whereby the stored signal is passed through an amplifier to a device for controlling the speed of the motor during the passage of the original and the copying material through the copying zone,
   and further comprising a third switching element disposed in the path of travel of the original downstream of the copying zone, which switching element is adapted for actuation by the trailing edge of the original and which when so actuated switches on a third step-by-step switching system whereby the stored signal is cancelled.

The invention still further provides an apparatus for automatically controlling the speed at which a succeeding original and copying material pass through the copying zone of a continuously operable copying machine having a motor drive for originals and copying material, the apparatus comprising, successively disposed in the path of travel of the original upstream of the copying zone:

at least one photosensitive measuring unit; arranged to measure the translucency of the original, at least one first switching element which is adapted for actuation by the leading edge of the original and when so actuated:
  a. switches on a first step-by-step switching system and
  b. connects the photosensitive measuring unit to a storage unit for a period depending on the measured translucency by way of the first step-by-step switching system whereby the signal derived from the measuring unit is stored, at least one second switching element which is adapted for actuation by the leading edge of the original and which when so actuated switches on a second step-by-step switching system whereby
  a. the stored signal is passed through an amplifier to a device for controlling the speed of the motor during the passage of the original and copying material through the copying zone and
  b. a stored signal relating to the preceding original is cancelled.

The photosensitive measuring unit for measuring the translucency of the original preferably comprises a plurality of photosensitive elements which are relatively small in order to increase the likelihood of the translucency of any part of the original that carries no written matter being measured. For the same reason, it is advantageous so to arrange the photosensitive elements that they are staggered with respect to one another both parallel to and at right angles to the direction in which the original moves. If the photosensitive measuring unit comprises a plurality of photosensitive elements, then a discriminator is connected between the photosensitive elements and the storage elements, which discriminator seeks out from among the signals measured at the photosensitive elements that signal corresponding to the greatest translucency. Photo resistors. photoelectric cells and the like can be used in known manner as the photosensitive elements.

In copying machines in which webs of copying material having different properties are stored and one of the webs is selected on the basis of the measured properties of the original, one photosensitive measuring unit is sufficient if the originals are always introduced on the same guide strip, i.e. on the same side, of a feed table. If however, the originals are introduced on the right-hand or left-hand guide strip of the feed table, depending upon their width, at least two photosensitive measuring units are present. The same applies in the case of copying machines in which a plurality of stacks of sheet copying material having different properties are stored.

The switching elements, disposed in the path of travel of the original upstream of the copying station, may be mechanical switches, such as for example micro-switches, photoelectric switches or inductive proximity switches. If, depending upon their width, the originals are introduced on the right-hand or left-hand guide strip of the feed table, the apparatus includes two first, second and third switching elements.

In one arrangement in accordance with the invention, each step-by-step switching system comprises a plurality of pairs of contacts and a contact wiper which, as soon as an original actuates the switching element associated with the particular step-by-step switching system, passes to the next pair of contacts. In order to store the signals relating to two originals and obtained on the basis of the measured translucency and later to interrogate these signals for the purpose of controlling the speed of the driving motor, each of the step-by-step switching systems must contain three pairs of contacts if the third switching element is disposed downstream of the copying station and the stored value relating to this original is cancelled upon actuation of the switching element by the trailing edge of the original. If however, the third switching element is disposed upstream of the copying station and the value associated with the preceding original is cancelled upon actuation by the leading edge of the original, then at least four pairs of contacts are required. For the purpose of storing the signal relating to each further original, the step-by-step switching systems must each comprise an additional pair of contacts. When the storage means comprises capacitors, the same applies as regards the number of capacitors.

When the storage means comprises capacitors and when the third switching element is disposed upstream of the copying station, then according to the invention, the capacitors are connected to the pairs of contacts in the step-by-step switching systems in the following way: each pair of contacts in the three step-by-step switching systems is connected to a capacitor, each capacitor being connected to the same pair of contacts in each of the first and second step-by-step switching systems, but to the next pair of contacts in the third step-by-step switching system. If, for example, the first capacitor of the storage means is connected to the first pair of contacts in the first step-by-step switching system, then it is connected to the first pair of contacts in the second step-by-step switching system and to the second pair of contacts in the third step-by-step switching system. If the third switching element is disposed downstream of the copying station, then the capacitors are connected to the same pair of contacts in each of all three step-by-step switching systems.

In the initial position, the contact wipers of the three step-by-step switching systems connect in each of these systems the same pair of contacts, e.g. the first of contacts in each case. If for some reason, e.g. interference pulses occurring when the voltage drops, this synchronous switching of the three step-by-step switching systems is interfered with, then a device, described in detail hereinafter, is supplied for re-establishing synchronous switching by hand.

According to the invention, the storage means in all the arrangements may comprise an analogue-digital flip-flop circuit instead of capacitors. In contrast to capacitors, this flip-flop circuit offers the advantage that the stored signals can be kept constant over a long period.

In a preferred arrangement, the second switching element in the path of travel of the original takes over the function of the third switching element, so that the latter can be dispensed with.

When the second switching element is actuated by the leading edge of the original, the signal relating to this original is interrogated while at the same time the signal relating to the preceding original is cancelled in the storage means. Furthermore, in this arrangement the second and third step-by-step switching systems are combined to form one system. This step-by-step switching system contains at least four contacts for interrogation of the stored signals and at least four contacts for cancellation of the stored signals. Also incorporated in the step-by-step switching system are two contact wipers which are mechanically interconnected but electrically separated from each other. In such an arrangement, one of the contact wipers is associated with the contacts for interrogating the signals, whereas the second contact wiper is associated with the contacts for cancellation of the signals. When the second switching element is actuated by the leading edge of the original, both contact wipers are shifted to an extent equal to one switching period of the next contact so that at the same time the stored signal relating to the original is interrogated and the stored signal relating to the preceding original is cancelled.

In this preferred arrangement, the storage means comprises at least four capacitors, and the first step-by-step switching system at least four pairs of contacts. The storage means and the two step-by-step switching systems are connected in the following manner: each pair of contacts of the first step-by-step switching system and each contact for interrogating and cancelling of the second step-by-step switching system are connected to a capacitor. Each capacitor is connected to the pair of contacts of the first step-by-step switching system, and in the second step-by-step switching system to the contact for the interrogation that corresponds to the pair of contacts, but to the next contact for the cancellation. In the initial position, the contact wiper of the first step-by-step switching system bears on that pair of contacts that corresponds to the contacts on which the contact wipers of the second step-by-step switching system bear.

When an original is introduced into the copying machine, it actuates the first switching element which due to a brief electrical pulse, switches on a first step-by-step switching system and also connects the photosensitive measuring unit to the storage means through the first step-by-step switching system. Since the connection due to the pulse is very brief only, it is established through a time-delay unit for a longer period in order to determine the translucency of a portion of the original and thus to increase the likelihood of the translucency measurement being carried out on a zone carrying no written matter. The time during which the connection is established must be such that for the highest speed of travel through the copying station and for the shortest size of original, the original covers the photosensitive measuring unit during this time. A disadvantage in this translucency measurement is that when the originals are long and the speed of travel through the copying station is low, only a portion of the original is used for the measurement. In order considerably to reduce the likelihood of the photosensitive measuring unit being covered by a written stroke during the measurements, it is advantageous to fix a time during which the connection is established not by means of a time-delay unit but by the length of the original.

For this reason a further switching element is provided in the path of travel of the original upstream of the photosensitive measuring unit, which switching unit, when actuated by the trailing edge of the original, breaks the connection between the photosensitive measuring unit and the storage means that will have been established when the first switching means was actuated by the leading edge of the original. The connection remains established as long as the two switching elements are covered by the original.

The stored signal relating to an original is interrogated when the second step-by-step switching system is switched on. The signal is passed through an amplifier, e.g. a transistor or an electronic valve, to a device, i.e. a regulator, which regulates the speed of revolution of the driving motor and thus the speed of travel of the original. A signal can be cancelled for example by short-circuiting the corresponding capacitor by way of a resistor.

When a succeeding original is fed into the copying machine, it first travels at the speed determined by the translucency of the preceding original, until its leading edge actuates the second switching element and the speed of the driving motor is controlled in dependence upon the translucency of the succeeding original. This is disadvantageous when the translucency of the preceding original was low and the speed of travel is correspondingly low. It is therefore advantageous to provide a time-delay unit controllable by the second switching element, which time-delay unit switches the driving motor to a pre-set idling speed when the original leaves the exposure station.

Instead of a time-delay unit controllable by the second switching element, it is possible to fix behind the copying cylinder a scanning device which switches the driving motor to a pre-set idling speed when actuated by the emerging original.

When an original having very low translucency is fed into the copying machine and when accordingly a very low speed of travel is required, it may happen, depending upon the characteristics of the regulator, that the driving motor will stop. To prevent this, a voltage, which corresponds to the lowest speed at which the driving motor continues to turn, is always applied to the regulator. Then, if an original having very low translucency is fed into the copying machine and, as a result of this measured translucency, a voltage lower than the minimum continuously applied to the regulator is passed to the latter when the signal is interrogated, the driving motor continues to turn at a speed corresponding to this minimum voltage. A time-consuming stoppage is thus avoided. In this arrangement also, the driving motor can be switched to a pre-set idling speed.

It is advantageous to insert in the beam of light used for measuring the translucency, filters which render effective that light-wave range in which the copying material is photosensitive. The filters may be arranged in the beam in front of the original, but preferably behind it and in front of the photosensitive measuring unit.

In accordance with a further feature of the invention, a dispersion film is inserted between the original and the light source in order to smooth out a great differing degree of dispersion in originals of differing translucency. Thus, a better correlation between the measured translucency values and the speed of travel through the copying station can be achieved by means of the dispersion films.

For measuring the translucency, use is preferably made of the light from the light source employed for copying, so that any fluctuations in the emission of light from the copying light source can be taken into account. The light from the copying light source can be conveyed to the photosensitive measuring unit and the aid of mirrors, metal tubes, or, preferably, UV-light-conducting fiber optics.

According to the invention, the apparatus may be calibrated by determining the speeds of travel through the copying station and the translucency values for a series of originals of different translucencies. In accordance with the values obtained, the passage through zero and the amplification may be so adjusted at the amplifier by means of a potentiometer that for each individual value for translucency a corresponding voltage is applied to the regulator, this voltage in turn providing the correct speed of the drivng motor and thus the correct speed of travel for each original. The adjustment of the gain and passage through zero of the amplifier is not only important as regards calibration of the apparatus, but also for adapting the apparatus to suit the particular photosensitivity of the copying material used. Some copying materials used in copying machines have very differing photosensitivities. Furthermore, the photosensitivity of one and the same copying material changes after a fairly lengthy storage period. However, in order to obtain copies with the correct background, the gain and passage through zero of the amplifier are correspondingly adjusted. Thus the background can be adapted to suit the particular original, depending upon whether the drawing was made in pencil or ink.

If necessary, the automatic control of speed through the copying station can be cut off by a manually-operated switching means, and a manually regulatable voltage applied to the regulator.

The invention is further illustrated by way of example in the accompanying drawings, in which.

Figure 2:
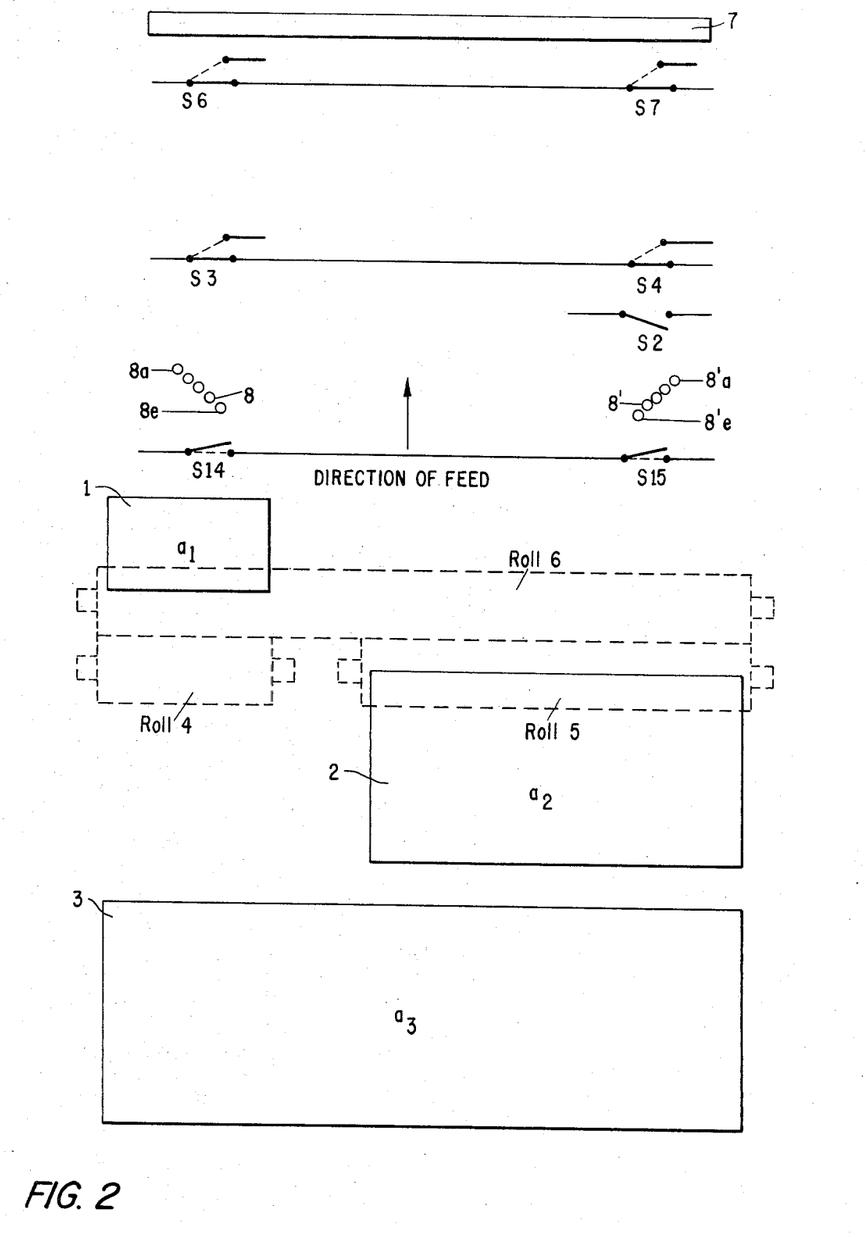
FIG. 2 is a diagrammatic plan view of the path of travel of originals upstream of the copying station, in the case of a second embodiment.

Referring to the drawings, depending upon whether an original 1 having a width $a_1$, an original 2 having a width $a_2$ or an original 3 having a width $a_3$ is fed into the copying machine, a corresponding one of three webs of copying material, provided in rolls 4, 5 and 6 respectively, is selected (see FIG. 2). An original 1 having a width $a_1$ is fed into the machine along a left-hand guide strip of a feed table (not shown in the drawing), an original 2 having a width $a_2$ along a corresponding right-hand guide strip, and an original 3 having a width $a_3$ can be guided optionally on the left or right.

On its way to a copying station 7, an original 1, 2 or 3 passes at least one of two photosensitive measuring units 8 and 8' which consist of the photosensitive elements 8a to 8e and 8'a to 8'e respectively. At this point, light from a copying light source provided in the machine passes through the original 1, 2 or 3, this light passing through the filters 9a to 9e and 9'a to 9'e respectively, and striking the photosensitive elements 8a to 8e and 8'a to 8'e respectively, which measure the translucency of the original 1, 2 or 3 (see FIG. 1). By way of amplifiers 10a to 10e and 10'a to 10'e respectively, the signals sent by the photosensitive elements 8a to 8e and 8'a to 8'e respectively and based on the measured translucency are passed to the discriminators 11 and 11' respectively. The discriminator 11 and 11' selects a signal that corresponds to the greatest translucency.

Figure 1:
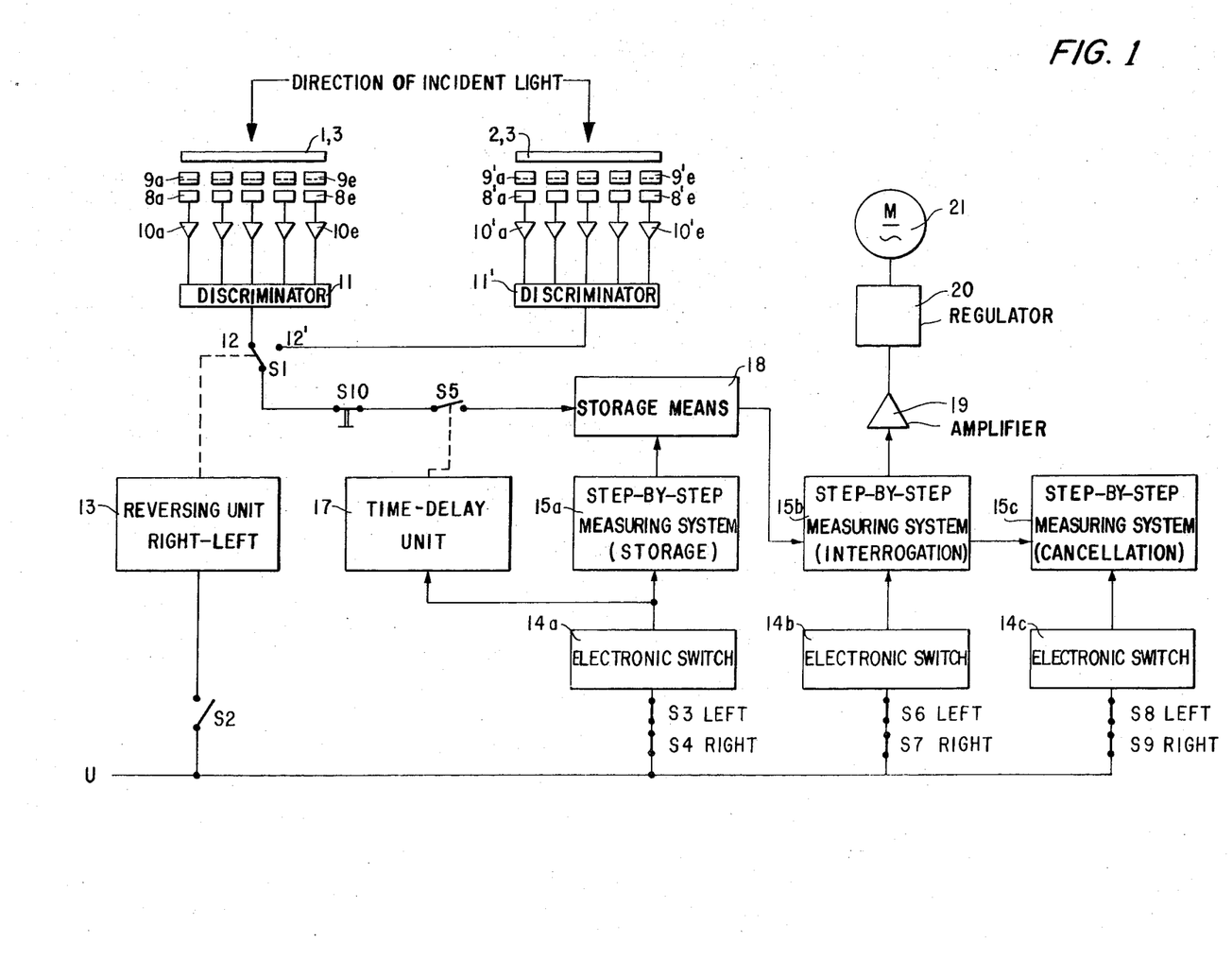
FIG. 1 is a block circuit diagram in the case of a first embodiment of copying machine.
Figure 3:
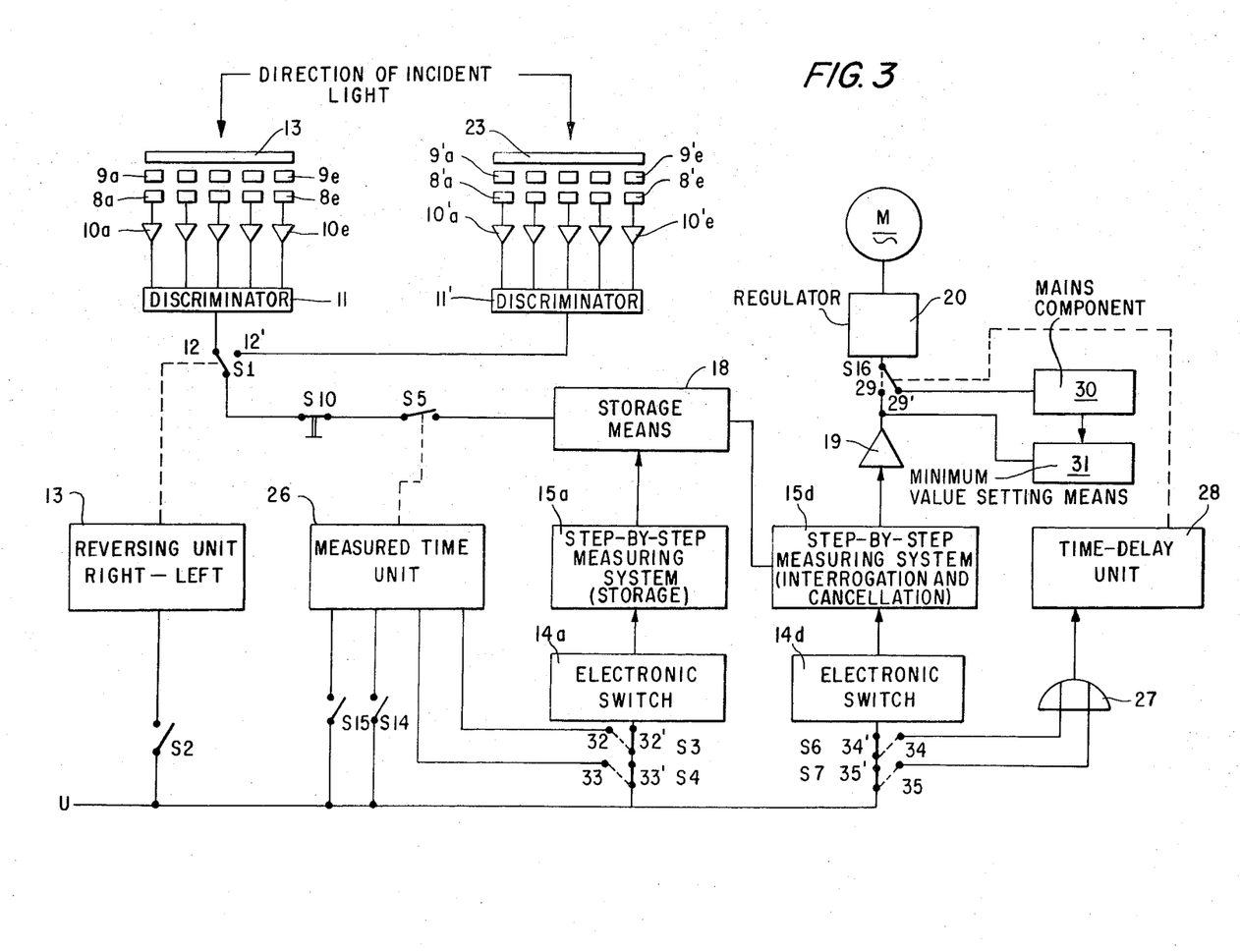
FIG. 3 is a block circuit diagram in the case of the second embodiment and FIGS. 4 and 5 are detailed circuit diagrams of the storage means and the step-by-step switching systems for the first and second embodiments respectively.
Figure 4:
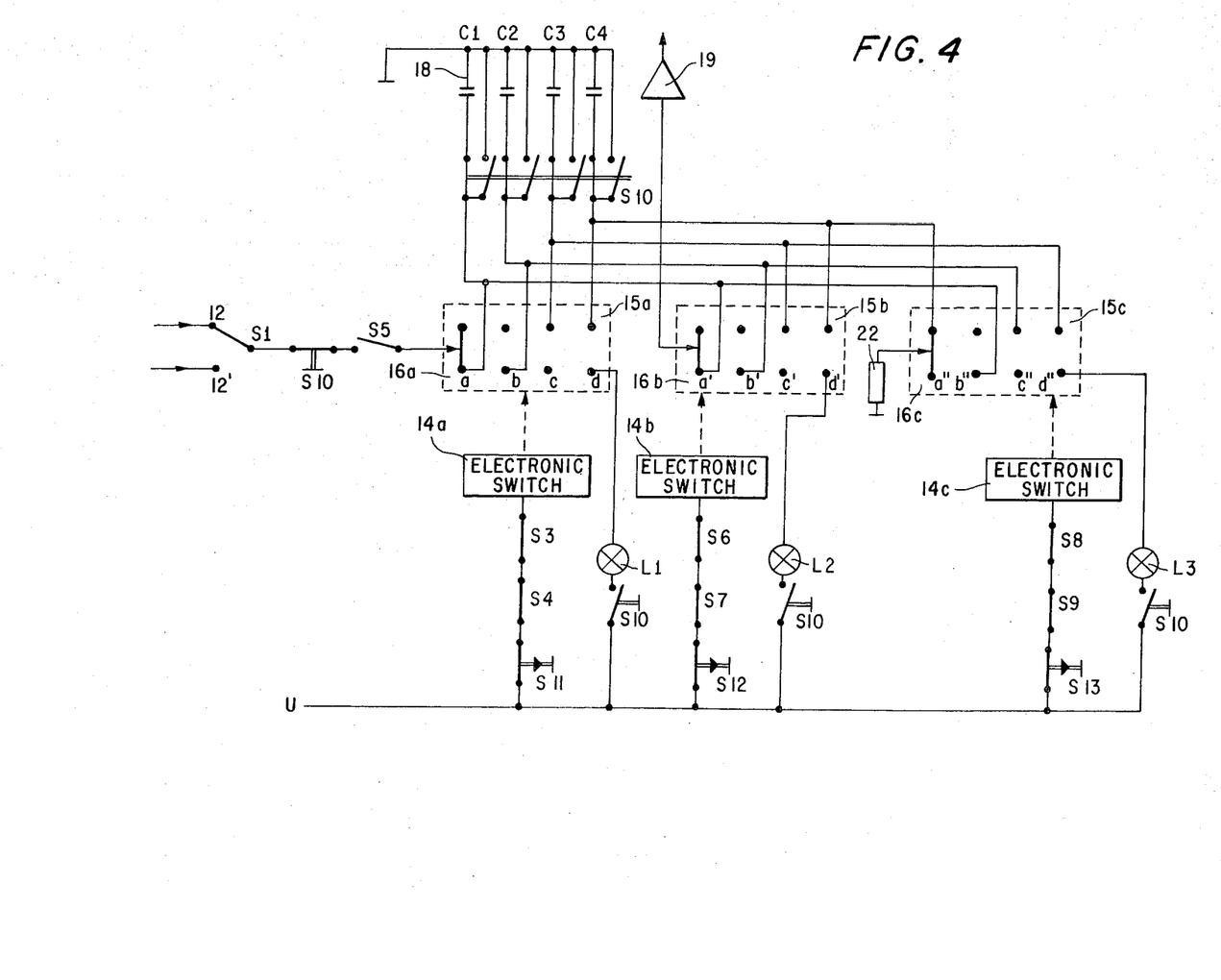

When an original 1 having a width $a_1$ is fed into the copying machine, its translucency is measured by the photo-sensitive measuring unit 8 since a switch $S_1$ which establishes connection between the photosensitive measuring units 8 and 8' and the remaining part of the measuring system normally bears against a contact 12 ( see FIGS. 1, 3 and 4 ). When however, an original 2 having a width $a_2$ is fed into the copying machine, then in the course of its travel it actuates a switch $S_2$ which, as long as it is in contact with the original 2, applies the switch $S_1$ to a contact 12' through a reversing unit 13, so that the photosensitive measuring unit 8' measures the translucency. The same occurs when an original 3 having a width $a_3$ is introduced on the right-hand side of the feed table. If it is introduced on the left-hand side, then the measuring unit 8' only measures when the original 3 is so wide that it also actuates the switch $S_2$ during the course of its travel.

Also disposed in the path of travel of the originals 1, 2 and 3 are two first switching elements $S_3$ and $S_4$, located to the rear of the photosensitive measuring units 8 and 8'. At least one of these switching elements $S_3$ and $S_4$ is actuated by the original 1, 2 and 3 on its way to the copying station 7, and as soon as the original covers all the photosensitive elements 8a to 8e and/or 8'a to 8'e of the photosensitive measuring units 8 and 8' respectively. As soon as at least one of the switching elements $S_3$ and $S_4$ is actuated, by way of an electronic switch 14a, a brief electrical pulse is emitted which causes a contact wiper 16a in a first step-by-step switching system 15a (for a storage means 18) to move, to an extent equal to a switching period, to an adjacent pair of contacts a, b, c or d, and also closes, by way of a time-delay unit 17, a normally open switch $S_5$ for a specific period (see FIG. 1). Thus, by way of the step-by-step measuring system 15a, connection is established between one of the photosensitive measuring units 8 and 8' and the storage means 18. By way of the discriminator 11 or 11' the signal corresponding to the greatest degree of translucency measured by the photosensitive elements 8a to 8e or 8'a to 8'e respectively is stored in one of the capacitors $C_1$, $C_2$, $C_3$ and $C_4$ of the storage means 18 (FIG. 4).

Downstream of the switching element $S_3$ and $S_4$ in the path of travel of the originals 1, 2 and 3 are disposed two second switching elements $S_6$ and $S_7$. At least one of these switching elements $S_6$ and $S_7$ is actuated by the original 1, 2 or 3 on its way to the copying station 7, so that the switching elements $S_6$ and/or $S_7$ release a brief electrical pulse by way of an electronic switch 14b, which pulse causes a contact wiper 16b in a second step-by-step switching system 15b (for the interrogation) to move to an extent equal to a switching period to an adjacent pair of contacts a', b', c' or d' (see FIG. 4). This causes one of the capacitors $C_1$, $C_2$, $C_3$ and $C_4$ to be connected to an amplifier 19, and in fact that one of of the capacitors $C_1$, $C_2$, $C_3$ or $C_4$ that is connected to the pair of contacts $a'$, $b'$, $c'$ or $d'$ reached by the contact wiper $16b$, is connected to the amplifier 19. The signal stored in the particular capacitor $C_1$, $C_2$, $C_3$ or $C_4$ is thus passed by way of the amplifier 19 to a regulator 20 which regulates the speed of revolution of a driving motor 21 and thus the speed of travel of the original 1, 2 or 3.

Finally, in the first embodiment (see FIG. 1), two third switching elements $S_8$ and $S_9$ (not shown in FIG. 2) are disposed in the path of travel of the original 1, 2 or 3 upstream of the copying station 7. At least one of these switching elements $S_8$ and $S_9$ is actuated by the original 1, 2 or 3 so that the switching elements $S_8$ or $S_9$ release a brief electrical pulse by way of an electronic switch $14c$, which pulse causes a contact wiper $16c$ in a third step-by-step switching system $15c$ ( for the cancellation ) to move to an extent equal to a switching period to an adjacent pair of contacts $a''$, $b''$, $c''$ or $d''$ (see FIG. 4). This establishes connection between one of the capacitors $C_1$, $C_2$, $C_3$ or $C_4$ and a grounded resistor 22, and in fact that one of the capacitors $C_1$, $C_2$, $C_3$ or $C_4$ which is connected to the pair of contacts $a''$, $b''$, $c''$ or $d''$ reached by the contact wiper $16c$, is connected to the resistor 22 and thus cancels its stored signal.

The switching elements $S_3$ and $S_4$ can be connected either in series or in parallel. In the first case they are normally closed ( see FIG. 1 or 4 ) and, when actuated by an original 1, 2 or 3, they are opened. The opening of one or both of the switching elements $S_3$ and $S_4$ causes the release of the pulse at the electronic switch $14a$. If the switching elements are connected in parallel, they are normally opened (not shown in the drawings), and when actuated by an original 1, 2 or 3, they are closed. The closing of one or both of the switching elements $S_3$ and $S_4$ causes the release of the pulse at the electronic switch $14a$. The same applies in the case of the switching elements $S_6 S_7$ and $S_8$ and $S_9$.

Each pair of contacts $a$ to $d$, $a'$ to $d'$ and $a''$ to $d''$ in the three step-by-step switching systems $15a$, $15b$ and $15c$ is connected to one of the capacitors $C_1$, $C_2$, $C_3$ and $C_4$. Each capacitor $C_1$, $C_2$, $C_3$ and $C_4$ is connected to each like pair of contacts $a$ to $d$ and $a'$ to $d'$ of the first and second step-by-step switching systems $15a$ and $15b$, for example $C_1$ to $a$ and $a'$, or $C_2$ to $b$ and $b'$, but to the next pair of contacts $b''$ to $a''$ of the third step-by-step switching system $15c$, for example $C_1$ to $b''$ or $C_2$ to $c''$ (see FIG. 4).

The contact wipers $16a$, $16b$ and $16c$ must be moved into the starting position in synchronism. When the contact wiper $16a$ in the step-by-step switching system $15b$, for example, connects the pair of contacts $a$, the contact wiper $16b$ in the step-by-step switching system $15b$ must connect the pair of contacts $a'$ and the contact wiper $16c$ in the step-by-step switching system $15c$ must connect the pair of contacts $a''$. If synchronous actuation of the three step-by-step switching systems $15a$, $15b$, and $15c$ is disturbed, for example by interference pulses during a voltage drop, then synchronism can be re-established manually. For this purpose, in each of the three step-by-step switching systems $15a$, $15b$ and $15c$, each one of the pairs of contacts $a$ to $d$, $a'$ to $d'$ and $a''$ to $d''$ is connected to a lamp $L_1$, $L_2$ and $L_3$ respectively. The contacts that are connected to the lamps are the same in the three step-by-step switching systems $15a$ $15b$ and $15c$.

In FIG. 4, for example, the contacts $d$, $d'$ and $d''$ are connected to the lamps $L_1$, $L_2$ and $L_3$ respectively. Also provided is a manually operable switching arrangement $S_{10}$ which when actuated firstly prevents connection between the photo-sensitive measuring units 8 and $8'$ and the step-by-step switching system $15a$, secondly short-circuits the capacitors $C_1$ to $C_4$ of the storage means 18 so that one pole of a voltage source is applied to each pair of contacts $a$ to $d$, $a'$ to $d'$ and $a''$ to $d''$ of the three step-by-step switching systems $15a$, $15b$, and $15c$, and thirdly applies the other pole of the voltage source to each of the lamps $L_1$, $L_2$ and $L_3$. With the aid of manually operable setting keys $S_{11}$, $S_{12}$ and $S_{13}$ the contact wipers $16a$, $16b$ and $16c$ respectively can be each individually displaced by way of the electronic switches $14a$ $14b$ and $14c$. When, for example, the contact wiper $16a$ is displaced with the aid of the setting key $S_{11}$ by way of the electronic switch $14a$, then the circuit is closed and the lamp $L_1$ lights up as soon as the contact wiper $16a$ has reached the pair of contacts $d$. The same applies in the case of the contact wipers $16b$ and $16c$. The three step-by-step switching systems are synchronously actuated as soon as all three lamps $L_1$, $L_2$ and $L_3$ light up.

In the second embodiment ( see FIGS. 2, 3 and 5), the functions of the third switching elements $S_8$ and $S_9$ are taken over by the second switching elements $S_6$ and $S_7$. The second and third step-by-step switching systems $15b$ and $15c$ are combined to form one system $15d$. If an original 1, 2 or 3 actuates one of the switches $S_6$ and $s_7$, and a brief electrical pulse is thus released by way of an electronic switch $14d$, then the contact wipers $16d$ and $16d'$ in the second step-by-step switching system $15d$ are each switched to an extent corresponding to a switching period to the next contact $e$, $f$, $g$ or $h$, and $e'$, $f'g'$, or $h'$ respectively. Thus, interrogation of the stored signals relating to an original 1, 2 or 3 is achieved for controlling the speed of revolution of the driving motor 21, and the stored signal relating to the preceding original 1, 2 or 3 is cancelled through the resistor 22.

Figure 5:
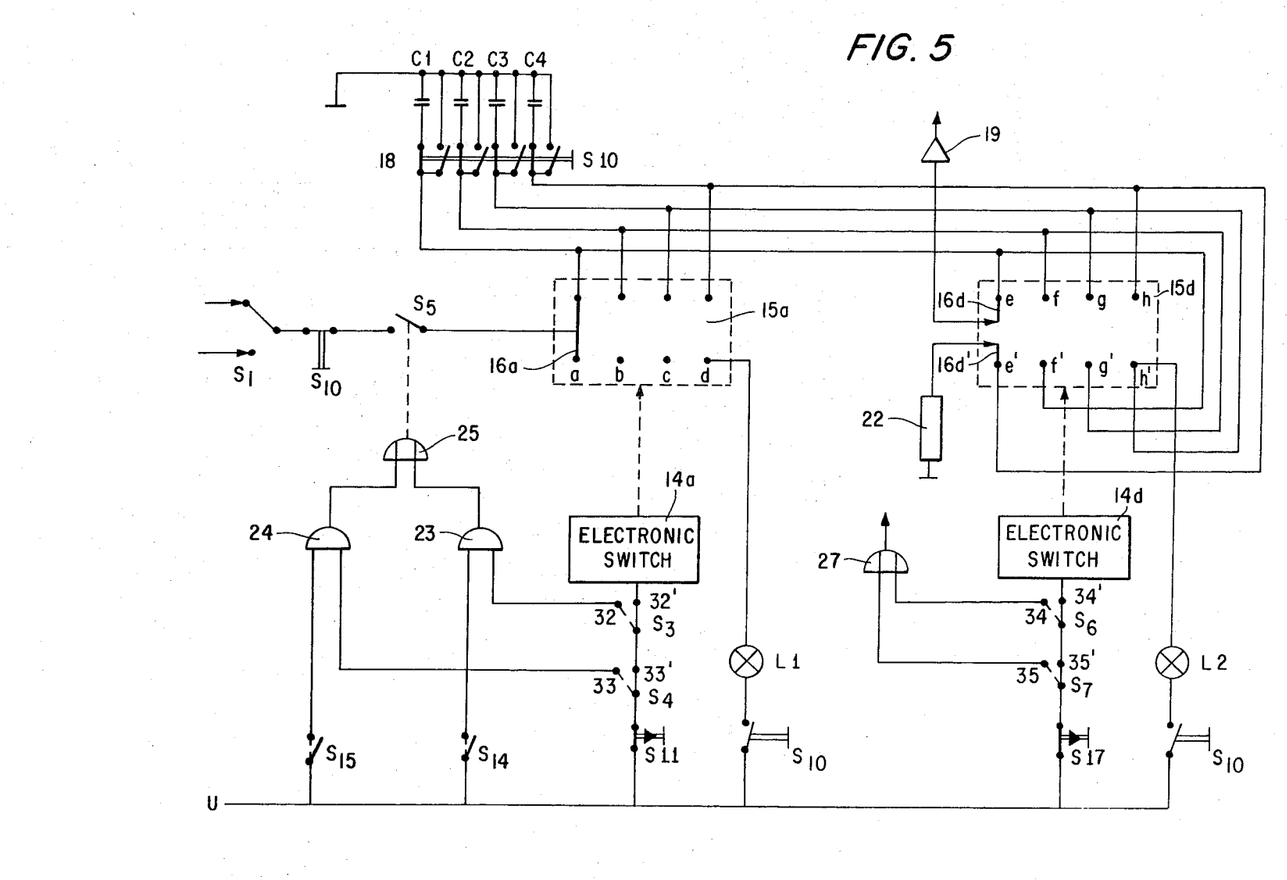

Each of the capacitors $C_1$, $C_2$, $C_3$ and $C_4$ is connected to a pair of contacts in the first step-by-nep switching system $15a$ and to a contact for interrogation and a contact for cancellation in the second step-by-step switching system $15d$, for example capacitor $C_1$ is connected to the pair of contacts $a$, the contact $e$ and the contact $f'$, . and capacitor $c_2$ is connected to the pair of contacts $b$, the contact $f$ and the contact $g'$.

In order to determine, by the length of the original, the time during which the photosensitive measuring unit 8 or $8'$ is connected to the storage means 18 through the first step-by-step switching system $15a$, switching elements $S_{14}$ and $S_{15}$ (see FIG. 2) are disposed in the path of travel of the original upstream of the photosensitive measuring units 8 and $8'$. The switching elements $S_3$ and $S_{14}$ are connected by an AND gate 23, and the switching elements $S_4$ and $S_{15}$ by an AND gate 24 (see FIG. 5). Each AND gate 23 and 24 then only passes a signal at its output when a signal is simultaneously sent to its two inputs. Thus, a signal is only passed on if the switching elements $S_3$ and $S_{14}$ or $S_4$ and $S_{15}$ are simultaneously actuated by the original. Connected downstream of the two AND gates 23 and 24 is an OR gate 25. This OR gate passes a signal to the switch $S_5$ as soon as one of the two AND gates 23 or 24 sends a signal. The switch $S_5$ is then closed for this period. The means for actuating the switching elements $S_3$, $S_4$, $S_{14}$ and $S_{15}$ through the AND gates 23 and 24 and the OR gate 25 is designated as a measured time unit 26 in the block circuit diagram of FIG. 3.

As can be seen from FIG. 3, the second switching elements $S_6$ and $S_7$ are connected to an OR gate 27 which, as soon as one of the two switching elements $S_6$ and $S_7$ is actuated by the leading edge of the original, sends a pulse to a time-delay unit 28. A switch $S_{16}$ is thereby immediately applied to its contact 29. The switch $S_{16}$ is disposed between the amplifier 19 and the regulator 20. As soon as the trailing edge of the original clears the switching element $S_6$ and/or $S_7$, the unit 26 switches in a delay period at the expiration of which the switch $S_{16}$ is lifted from the contact 29 and applied to its contact 29', so that the regulator 20 is connected to a mains component 30. The voltage now applied to the regulator 20 can be pre-set and advantageously so selected that the driving motor 21 turns at its highest speed.

As also shown in FIG. 3, voltage is applied to the regulator 20 through a minimum-value setting means 31, when switch $S_{16}$ bears against its contact 29. The minimum-value setting means 31 may for example comprise a potentiometer in combination with diodes by means of which that voltage is applied to the regulator 20 that corresponds to the lowest speed at which the driving motor 21 is able to turn.

The mode of operation will now be explained by reference to the second embodiment and assuming two originals to be fed into the copying machine one after the other. The switch $S_{16}$ bears on the contact 29' and the regulator 20 is thus connected to the mains component 30. The driving motor 21 is turning at idling speed which corresponds to the voltage applied to the regulator 20 (see FIG. 3). As seen in FIG. 5, the capacitor $C_4$ is discharged through the resistor 22. The signal relating to the last original is still stored in the capacitor $C_1$. If now, for example, an original 1 is fed into the copying machine, it first actuates the switching element $S_{14}$. Since this switching element is connected to the switching element $S_3$ through the AND gate 23, and the original has not yet reached $S_3$, the switch $S_5$ remains open. The original 1 passes over the photosensitive measuring unit 8. When the switching element $S_3$ is actuated by the leading edge of the original, switching element $S_3$ is changed over from its contact 32' to its contact 32. When this happens a pluse is sent to the electronic switch 14a, so that the contact wiper 16a is moved from the pair of contacts $a$ to the pair of contacts $b$. Since the switching elements $S_3$ bears on its contact 32 and the switching element $S_{14}$ is closed, the AND gate 23 sends the signal to the OR gate 25 and the switch $S_5$ is thus closed. The photosensitive measuring unit 8 is connected through the step-by-step switching system 15a to the capacitor $C_2$ of the storage means 18. The capacitor $C_2$ is charged to an extent corresponding to the translucency of the original 1 measured on the photosensitive measuring unit 8. As soon as the trailing edge of the original clears the switching element $S_{14}$, the latter is opened again, and since a signal is now still present only at one input of the AND gate 23, the switch $S_5$ is opened. When the trailing edge of the original clears the switching element $S_3$, this is again applied to the contact 32'.

In the meantime, a second original, the original 2, is fed into the copying machine. It actuates the switching element $S_{15}$, passes over the photosensitive measuring unit 8' and actuates the switch $S_2$. As described above, the switch $S_1$ normally applied to the contact 12 is thus lifted from this contact and applied to the contact 12'. When the leading edge of the original reaches the switching element $S_4$, the contact wiper 16a moves from the pair of contacts $b$ to the pair of contacts $c$, and since the switching element $S_4$ now lies on its contact 33, and switching element $S_{15}$ is at the same time closed, the switch $S_5$ is closed. The capacitor $C_3$ is charged to an extent corresponding to the translucency of the original 2. As soon as the trailing edge of the original clears the switching element $S_{15}$, the switch $S_5$ is opened again. The introduction of a third original is not possible since the capacitor $C_4$ is grounded through the contact wiper 16d'. To enable a third original to be fed in and the signal relating to it to be stored, a fifth capacitor would have to be provided, and also a fifth pair of contacts in the step-by-step switching system 15a, and a fifth contact each, for interrogation and cancellation, in the step-by-step switching system 15d.

When the original 1 reaches the switching element $S_6$, the latter is changed over from its contact 34' to its contact 34. This causes a brief pulse to be released at the electronic switch 14d, which pulses switches the contact wiper 16d in the step-by-step switching system 15d from the contact $e$ to the contact $f$, and switches the contact wiper 16d', mechanically connected to the contact wiper 16d, from the contact $e'$ to the contact $f'$. The switching of switching element $S_6$ over to its contact 34 also results in the actuation, by way of the OR gate 27, of the time-delay unit 28 which immediately applies the switch $S_{16}$ to the contact 29. The signal relating to the original 1 and stored in the capacitor $C_2$ is thereby applied by way of the amplifier 19 to the regulator 20 which appropriately regulates the speed of revolution of the drive motor 21. If the value of the voltage deriving from the amplifier 19 is lower than the voltage applied to the regulator through the minimum-value setting means 31, the driving motor continues to run at a speed which corresponds to the voltage deriving from the minimum-value setting means 31. If the level of the voltage deriving from the amplifier 19 is higher than that of the minimum-value setting means 31, then the driving motor 21 turns at a speed which corresponds to the level of the voltage deriving from the amplifier 19.

Switching of the contact wiper 16d' discharges the capacitor $C_1$ through the resistor 22. The capacitor $C_4$ is free to store the signal relating to a fresh original which now may be introduced.

When the trailing edge of the original 1 leaves the switching element $S_6$, the latter is changed back to its contact 34' so that the time-delay unit 28 switches in a specific delay period upon the expiration of which switch $S_{16}$ is applied to its contact 29'. The voltage of the mains component 30 is thus applied to the regulator. The delay period is such that upon its expiration the original 1 will have left the copying station 7.

The original 2 is still located between the machine feed point and the copying station 7. When it reaches the switching element $S_7$, the latter is applied to its contact 35, and thus the switch $S_{16}$ is again applied to the contact 29. At the same time, the contact wipers 16d and 16d' in the second step-by-step switching system 15d are each moved forward to an extent corresponding to a switching period to the next contact, i.e.

to the contacts g and g'. The signal relating to the original 2 is thus interrogated by the capacitor $C_3$ so that the original 2 enters the copying station 7 at a speed of travel corresponding to its translucency. At the same time, the signal relating to the origianl 1 and stored in the capacitor $C_2$ is cancelled; the capacitor $C_1$ is free for storing a signal relating to a further original. When the switch $S_2$ is cleared by the trailing edge of the original 2, the switch $S_1$ is again applied to its contact 12. When the switching element $S_7$ is cleared, the switch $S_{16}$ is again applied to its contact 29' after a specific time lag. The driving motor 21 again turns at its idling speed.

As regards synchronization of the step-by-step switching systems 15a and 15d, the same applies as in the first embodiment. Since the contact wipers 16d and 16d' are mechanically interconnected, it suffices simply to connect one lamp $L_2$ to the contact h', and it is only necessary to have one manually operable switch $S_{17}$ with which the contact wipers 16d and 16d' each can be moved forward to an extent equal to the switching period. As soon as lamps $L_1$ and $L_2$ light up together, the two step-by-step switching systems 15a and 15d are actuated in synchronism.

It will be obvious to those skilled in the art that many modifications may be made within the scope of the present invention without departing from the spirit thereof, and the invention includes all such modifications.

What is claimed is:

1. An apparatus for automatically controlling the speed at which a succeeding original and copying material pass through the copying zone of a continuously operable copying machine having a motor drive for originals and copying material, said apparatus comprising, successively disposed in the path of travel of the said original upstream of the copying zone:
   at least one photosensitive measuring unit means, arranged to measure the translucency of the said original,
   at least one first switching element means which is adapted for actuation by the leading edge of the said original and which when so actuated:
   a. switches on a first step-by-step switching system, and
   b. connects the photosensitive measuring unit means to a storage unit for a brief period by way of the said step-by-step switching system whereby the signal derived from said measuring unit means is stored,
   at least one second switching element means which is adapted for actuation by the leading edge of the said original and which when so actuated switches on a second step-by-step switching system whereby the stores signal is passed through an amplifier to a device for controlling the speed of the motor during the passage of the said original and copying material through the copying zone, and
   at least one third switching element means which is adapted for actuation by the leading edge of the said original and which when so actuated switches on a third step-by-step switching system, whereby a stored signal relating to the preceding original is cancelled.

2. An apparatus as claimed in claim 1, in which the storage unit comprises at least four capacitors and each of the three step-by-step switching systems comprises a series of at least four pairs of contacts which are each connected to one of the capacitors, each capacitor being connected to those pairs of contacts of the first and second step-by-step switching systems which are in the same positions in the corresponding series, but to the next pair of contacts of the series in the case of the third step-by-step switching system.

3. An apparatus as claimed in claim 1, in which, in the initial position in each step-by-step switching system, contact wipers in the three step-by-step switching systems connect pairs of contacts which are in the same positions in corresponding series.

4. An apparatus as claimed in claim 3, in which, for the purpose of synchronizing the three step-by-step switching systems, one of the pairs of contacts in each of said systems is connected respectively to one of three lamps, the pairs of contacts connected to the lamps being in the same positions in their corresponding series, and a manually operable switching means is present which is so arranged that when actuated it
   prevents connection between the photosensitive measuring unit means and the storage means,
   short-circuit the capacitors of the storage means, so that one pole of a voltage source is applied to each pair of contacts of the three step-by-step switching systems, and
   applies to other pole of the voltage source to each of the lamps,
   and manually operable setting keys are provided by means of which the contact wipers are individually displaceable to their alternative contacts.

5. An apparatus for automatically controlling the speed at which an original and copying material pass through the copying zone of a copying machine having a motor drive for original and copying material, said apparatus comprising, successively disposed in the path of travel of the original upstream of the copying zone:
   at least one photosensitive measuring unit means, arranged to measure the translucency of the original,
   at least one first switching element means which is adapted for actuation by the leading edge of the original and which when so actuated:
   a. switches on a first step-by-step switching system, and
   b. connects the photosensitive measuring unit means to a storage unit for a brief period by way of the said step-by-step switching system whereby the signal derived from said measuring unit means is stored,
   at least one second switching element means which is adapted for actuation by the leading edge of the original and which when so actuated switches on a second step-by-step switching system whereby the stored signal is passed through an amplifier to a device for controlling the speed of the motor during the passage of original and copying material through the copying zone,
   and further comprising a third switching element means disposed in the path of travel of the original downstream of the copying zone, which latter switching element means is adapted for actuation by the trailing edge of the original and which when so actuated switches on a third step-by-step switching system whereby the stored signal is cancelled.

6. An apparatus as claimed in claim 5 in which, in the initial position in each step-by-step switching system, contact wipers in the three step-by-step switching systems connect pairs of contacts which are in the same positions in corresponding series.

7. An apparatus as claimed in claim 6, in which, for the purpose of synchronizing the three step-by-step switching systems, one of the pairs of contacts in each of said systems is connected respectively to one of three lamps, the pairs of contacts connected to the lamps being in the same positions in their corresponding series, and a manually operable switching means is present which is so arranged that when actuated it
  prevents connection between the photosensitive measuring unit means and the storage means,
  short-circuits the capacitors of the storage means, so that one pole of a voltage source is applied to each pair of contacts of the three step-by-step switching systems, and
  applies to other pole of the voltage source to each of the lamps,
and manually operable setting keys are provided by means of which the contact wipers are individually displaceable to their alternative contacts.

8. An apparatus as claimed in claim 5, in which the storage unit comprises at least three capacitors and each of the three step-by-step switching systems comprises a series of at least three pairs of contacts, each pair of contacts being connected to one of the capacitors and each capacitor being connected to those pairs of contacts in the three step-by-step switching systems which are in the same positions in the different series.

9. An apparatus for automatically controlling the speed at which a succeeding original and copying material pass through the copying zone of a continuously operable copying machine having a motor drive for originals and copying material, said apparatus comprising, successively disposed in the path of travel of the said original upstream of the copying zone:
  at least one photosensitive measuring unit means, arranged to measure the translucency of the said original,
  at least one first switching element means which is adapted for actuation by the leading edge of the said original and when so actuatd:
    a. switches on a first step-by-step switching system and
    b. connects the photosensitive measuring unit means to a storage unit for a brief period by way of the said step-by-step switching system whereby the signal derived from said measuring unit is stored,
  at least one second switching element means which is adapted for actuation by the leading edge of the said original and which when so actuated switches on a second step-by-step switching system whereby
    a. the stored signal is passed through an amplifier to a device for controlling the speed of the motor during the passage of the said original and copying material through the copying zone, and
    b. a stored signal relating to the preceding original is cancelled.

10. An apparatus as claimed in claim 9, in which the storage unit comprises an analogue-digital controlled flip-flop circuit.

11. An apparatus as claimed in claim 9, in which at least one further switching element is disposed in the path of travel of the original upstream of the photosensitive measuring unit, which switching element is adapted to disconnect the photosensitive measuring unit from the storage unit when the trailing edge of the original passes said further switching element or elements.

12. An apparatus as claimed in claim 9, including means for continuously applying a voltage corresponding to the lowest speed of the motor to the means for controlling the speed of this motor.

13. An apparatus as claimed in claim 9, including a time-delay unit which is controllable by the second switching element and by means of which the driving motor can be switched to a pre-set idling speed.

14. An apparatus as claimed in claim 9, in which the photosensitive measuring unit means comprises a plurality of photosensitive elements distributed across the path of the original and
  including a discriminator connected between the photosensitive measuring unit and the storage unit for the purpose of selecting that signal corresponding to the greatest translucency of the original.

15. An apparatus as claimed in claim 14, in which the photosensitive elements are in staggered relation to one another parallel to the direction of movement of the original.

16. An apparatus as claimed in claim 9, including filters disposed in the path of a beam of light used for measuring the translucency of the original.

17. An apparatus as claimed in claim 9, including a dispersion film located between the light source used for measuring the translucency and the path of the original.

18. An apparatus as claimed in claim 9, in which a copying light source is arranged for use as the light source for measuring translucency.

19. An apparatus as claimed in claim 18, including UV-light-conducting fiber optics for directing the light.

20. An apparatus as claimed in claim 9, including potentiometers for suiting the particular sensitivity of the copying material and for calibrating the control apparatus, whereby the passage through zero and also the gain of the amplifier can be adjusted.

21. An apparatus as claimed in claim 9, in which the storage unit comprises at least four capacitors, the first step-by-step switching system comprises a series of at least four pairs of contacts, and the second step-by-step switching system comprises a series of at least four contacts for interrogation and a series of at least four contacts for cancellation and also two contact wipers which are mechanically interconnected but electrically separate from one another.

22. An apparatus as claimed in claim 21, in which each pair of contacts of the first series and each contact of a series for interrogation and of a series for cancellation are connected to one of the capacitors, each capacitor being connected to that pair of contacts of the first series and to that contact for interrogation which are in the same positions in the series, but to the next contact in the said series for cancellation.

23. An apparatus as claimed in claim 9, in which, in the initial position, a contact wiper of the first step-by-step switching system bears on that one of the pairs of contacts of the system that corresponds to the contacts of the second step-by-step switching system on which contact wipers of the second step-by-step switching system bear.

24. An apparatus as claimed in claim 23, in which for the purpose of synchronizing the two step-by-step switching systems, one of the pairs of contacts in the first system and one of the contacts in the second system are each connected to one of two lamps, the pair of contacts of the first system, connected to a first of these lamps corresponding to the contact of the second system connected to the second lamp, and a manually operable switching means is provided which upon actuation prevents connection between the photosensitive measuring unit means and the storage means, short-circuits the capacitors of the storage means so that one pole of a voltage source is applied to each pair of contacts of the first step-by-step switching system and to each contact of the second step-by-step switching system, and applies the other pole of the voltage source to each of the two lamps, and including manually operable setting keys, by means of which the contact wipers in the two step-by-step switching systems are displaceable to their alternative contacts.

* * * * *